No. 698,196. Patented Apr. 22, 1902.
R. W. HENRY.
CULTIVATOR.
(Application filed Oct. 19, 1901.)
(No Model.) 2 Sheets—Sheet 1.
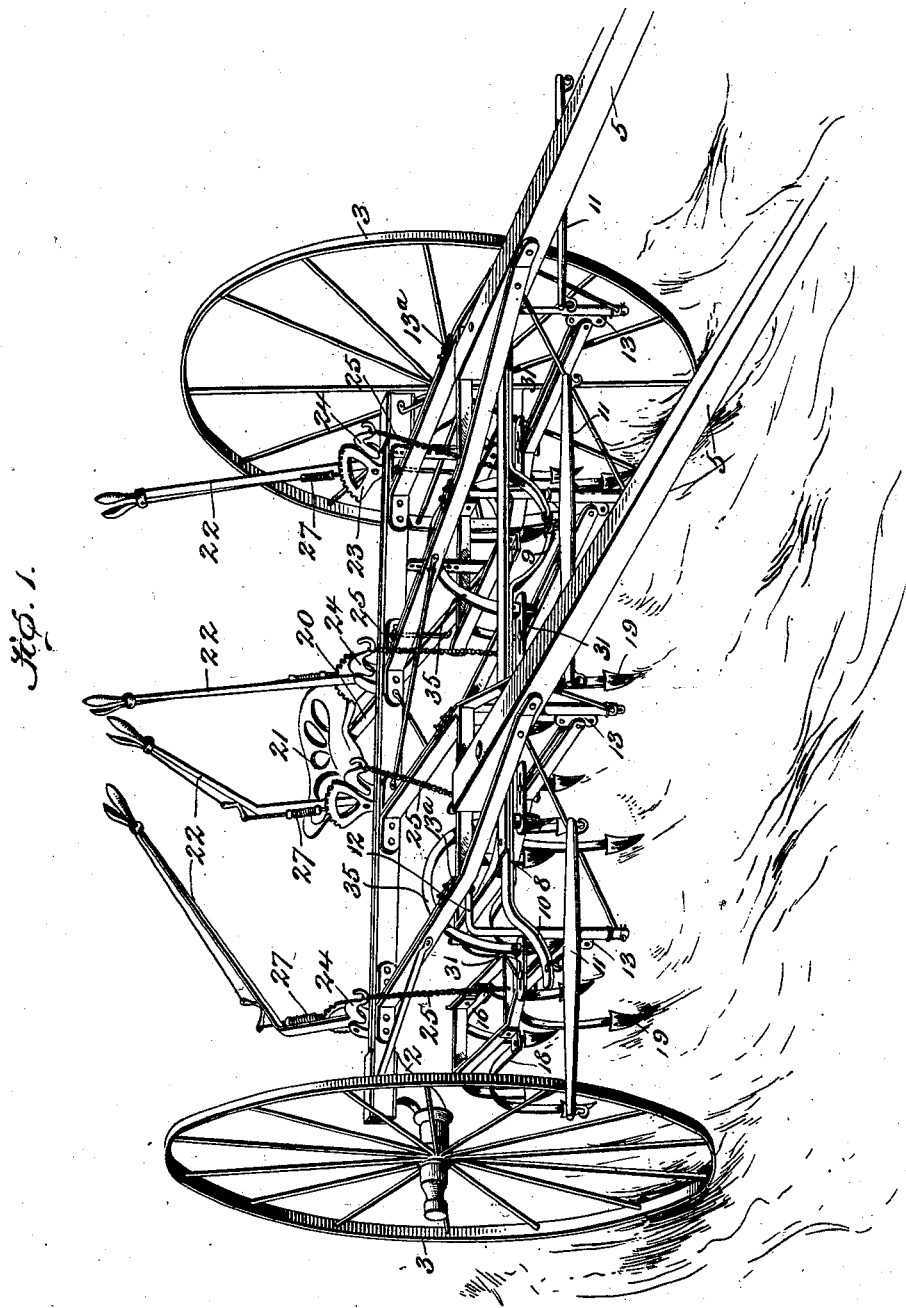
WITNESSES: INVENTOR:
Robert W. Henry
BY
ATTORNEY
THE NORRIS PETERS CO., PHOTO-LITHO., WASHINGTON, D. C.

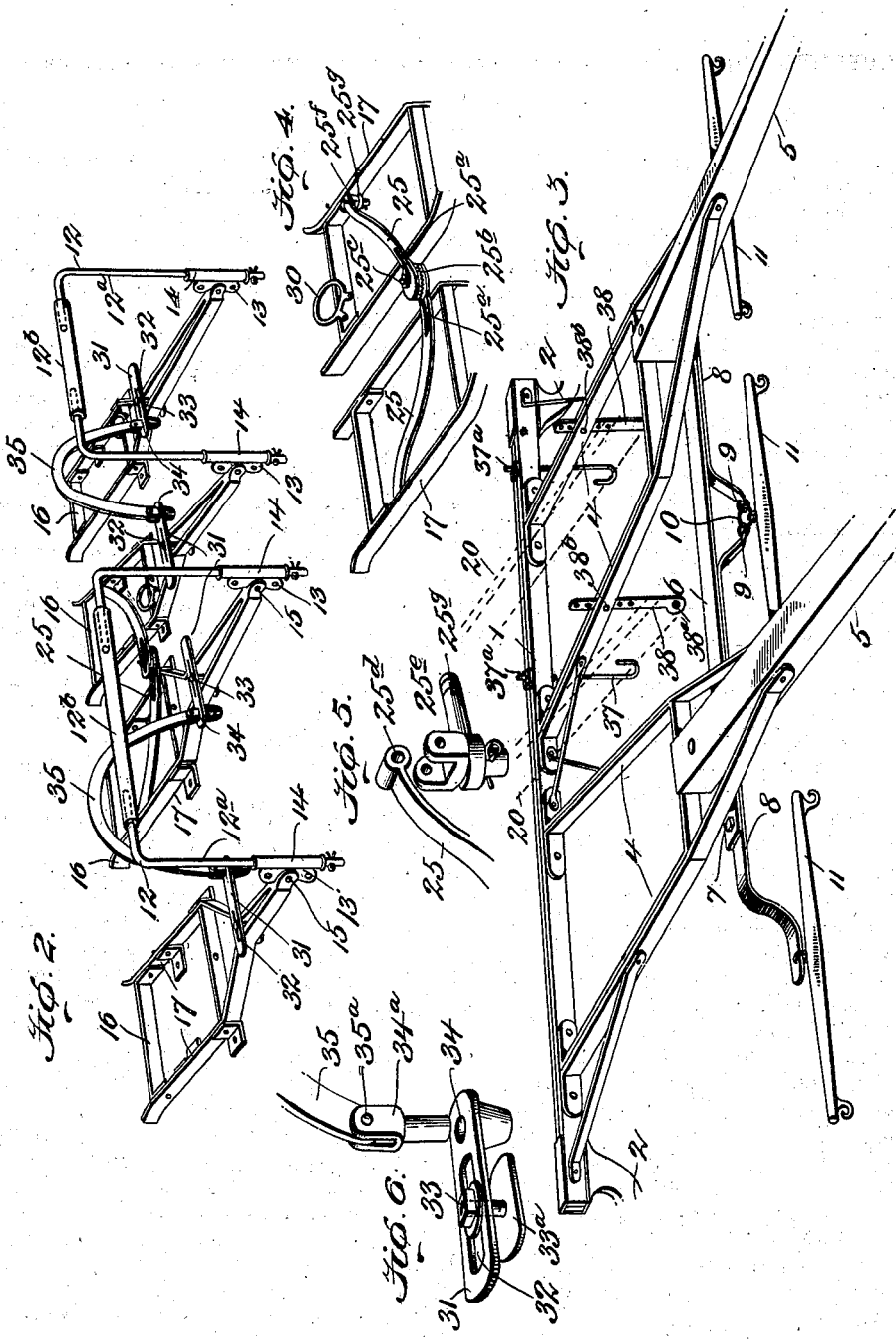

UNITED STATES PATENT OFFICE.

ROBERT W. HENRY, OF CONNERSVILLE, INDIANA.

CULTIVATOR.

SPECIFICATION forming part of Letters Patent No. 698,196, dated April 22, 1902.

Application filed October 19, 1901. Serial No. 79,278. (No model.)

*To all whom it may concern:*

Be it known that I, ROBERT W. HENRY, a citizen of the United States, residing at Connersville, in the county of Fayette and State of Indiana, have invented new and useful Improvements in Cultivators, of which the following is a specification.

This invention relates to improvements in straddle-row cultivators; and the objects and advantages thereof, together with the novel features of the invention, will appear in the following description and claims.

Referring to the drawings, Figure 1 is a perspective view embodying my improvements. Fig. 2 is a similar view in detail of the cultivator-shovel-carrying frames or gangs. Fig. 3 is a similar view of the draft-frame and its appurtenances. Figs. 4, 5, and 6 are details in perspective, hereinafter particularly referred to.

Similar numerals of reference indicate similar parts throughout the drawings.

From the opposite ends of a transverse axle 1 may be suspended a pair of journal-bearings 2, upon which are mounted the usual ground-wheels 3. A pair of suitably-braced hounds 4 extend and converge forward from each side of the center of the axle 1, and at the front ends each pair of said hounds embrace and are securely bolted to a draft pole or tongue 5. The rear ends of the draft-poles 5 are connected at their under sides to a transverse draft-bar 6, and bolted pivotally to the under side of said draft-bar beyond their centers, as at 7, are opposite evener-bars 8, extending beyond the ends of the aforesaid draft-bar. The ends of evener-bars 8 are depressed, the inner ends being each provided with a clevis-ring 9, the two clevis-rings being loosely connected by a draft-ring 10. From the draft-ring 10 and each of the declining ends of the evener-bars is loosely suspended a singletree 11, whereby, as will be obvious, three horses are provided for, the center animal having the longer leverage.

A pair of inverted-U-shaped bails 12 depend from the under side of the hounds 4, the terminal of each bail at its lower end being provided with a clevis 13, swiveled in position thereon by a sleeve 14, and therefore free to swing horizontally. Each bail 12 comprises opposite bent or L-shaped sections 12ª, the upper or horizontal ends thereof being connected by a telescopic sleeve 12ᵇ. The bails 12 are suspended loosely in suspension-clips 13ª, bolted to the hounds 4.

Adjustably pivoted so as to be capable of vertical movement to the clevis 13 by means of bolts 15 is a shovel-supporting frame or gang 16, which is of the usual construction, and therefore comprises a pair of converging beams 17. From each of these frames depend standards 18, at the lower ends of which are supported the usual cultivator teeth or shovels 19. It will be obvious that the several cultivator-frames 16 have both a vertical and a horizontal movement.

Suitably supported upon converging bars 20, in rear of the transverse axle 1, is a seat 21 for the driver, and converging to a point readily accessible from the seat is a series of hand-levers 22. These levers are so bent or disposed as to bring their upper ends within convenient reaching distance of the driver when perched upon his seat.

The seat-bars 20 may be fulcrumed in suspension-hooks 37, depending from the axle 1, the upper ends of said hooks being threaded and provided with nuts 37ª. At their front ends the seat-bars are pivotally connected by bolts 38ª to the lower ends of bars 38, made adjustable by pins or bolts 38ª, by which they are suspended in the hounds 4.

Each of the hand-levers is fulcrumed upon a toothed segment 23 and beyond its fulcrum-point merges into a hook 24, to each of which hooks is connected the upper end of a chain 25ʰ, the lower end of which is connected to a convenient cross-piece or some other part of the cultivator-frame 16. A spring-actuated locking-pawl 27 is provided for each lever, whereby the latter may be locked at any point of its adjustment. It will of course be obvious that the said levers serve their usual functions of raising and lowering the cultivator frames or gangs.

Opposite stirrups or foot-rests 30 are supported upon the two intermediate cultivator-frames 16, said stirrups being so disposed as to accommodate themselves to the position of the driver. It will be obvious that through these stirrups the driver may depress and guide the cultivators.

As best shown in Figs. 4 and 5, the two intermediate gangs are adjustably connected and so as to move in unison laterally by means of the overlapped curved bars 25, the inner ends of which may be adjustably connected by any ordinary devices suitable for the purpose—as, for example, the said bars may be slotted, as at 25$^a$, have interposed toothed washers 25$^b$ and a connecting-bolt 25$^c$. The vertical pivotal adjustment for the ends of the bars 25 may be provided for by forming eyes 25$^d$ in the ends of the bars, the same entering and being pivotally connected to the upper ends of shackles 25$^e$ by bolts 25$^f$. These shackles may be swiveled in eyes 25$^g$, extending laterally from the cultivator-beams 17.

Upon each of the cultivator-frames 16, near the front end thereof, is a transverse plate 31, each plate being provided with a longitudinally-disposed intermediate slot 32, through which and a lower plate 33$^a$ is passed an adjusting-bolt 33, carrying a nut. The inner ends of the two outer bars 31 and the opposite ends of said two intermediate bars are provided with openings 34, and in the same are swiveled the lower extremities of a pair of shackles 34$^a$, inverted-U-shaped connecting-arches 35 being pivoted at 35$^a$ thereto.

It will be obvious that each cultivator frame or gang is capable of being raised and lowered by the levers 22 independent of the others, so that any one of the gangs may be caused to avoid a stump or other obstruction without disturbing the operation of the remaining gangs; also, that any lateral movement of the frames, as imparted by the driver's feet, will be immediately transmitted to the other gangs uniformly. The several gangs composing the series may be laterally adjusted with relation to each other, and while each is to a certain extent independent of the others, yet the entire series move in unison.

Having thus described my invention, what I claim is—

1. In a cultivator, the combination with the draft-frame; of the inverted-U-shaped bails 12 suspended therefrom; clevises swiveled on the lower ends of said bails; cultivator-frames loosely coupled to the clevises; and loose connections between the cultivator-frames.

2. In a cultivator, the combination with the draft-frame; of the inverted-U-shaped bails suspended therefrom; clevises swiveled on the lower ends of said bails; cultivator-frames coupled loosely to the clevises; and inverted-U-shaped coupling arches or yokes connecting said cultivator-beams.

3. In a cultivator, the combination with a gang of cultivator-frames; and a draft-frame common thereto; of a plate loosely mounted upon each cultivator-frame; and inverted-U-shaped couplings loosely connecting the adjacent ends of each two plates for lateral and vertical movements.

4. In a cultivator, the combination, with a gang of cultivator-frames; and a draft-frame common to all; of a plate mounted upon each cultivator-frame and provided with intermediate and end slots; bolts passed through the intermediate slots; and the arched couplings having their ends loosely connected with the end openings or slots for lateral and vertical movements.

5. In a cultivator comprising a series of gangs, and in combination therewith, a pair of bars loosely connected for vertical and lateral movements to the beams of two adjacent gangs; and means for adjustably connecting the meeting ends of said bars.

6. In a cultivator as described, and in combination therewith, a pair of bars adjustably connected at their outer ends to the two intermediate cultivator-frames and adjustably connected at their inner ends to each other; and arches loosely connecting the two outer cultivator-frames in series.

7. In a cultivator, the combination with the framework, of pairs of gangs or cultivator-frames; draft-bails loosely suspended from the framework and having one of the gangs connected to each of their terminals; arches loosely connecting in series those gangs connected to each bail; and an adjustable connection between the inner gangs of the series.

8. In a cultivator, the combination with the framework; of pairs of gangs or cultivators; opposite adjustable draft-bails loosely suspended from the framework, and having one of the gangs connected to each of their terminals; arches adjustably and loosely connecting in series those gangs connected to each bail; and a pair of adjustably-connected bars loosely connected at their outer ends to the inner gang of said series.

In testimony whereof I affix my signature in presence of two witnesses.

ROBERT W. HENRY.

Witnesses:
HYATT G. FROST,
R. H. GAMBLE.